April 11, 1961 W. P. DE KOKER ET AL 2,979,567

FREQUENCY-SHIFT TELEGRAPHY RECEIVER

Filed Sept. 16, 1957

INVENTOR

WILLY PETRUS DE KOKER

STEPHANE JEAN GUSTAVE DE VLEMINCK

BY

Frank R. Trifari

AGENT

United States Patent Office 2,979,567

Patented Apr. 11, 1961

2,979,567

FREQUENCY-SHIFT TELEGRAPHY RECEIVER

Willy Petrus De Koker and Stephane Jean Gustave De Vleminck, both of Brussels, Belgium, assignors to North American Philips Company, Inc., New York, N.Y., a corporation of Delaware Filed Sept. 16, 1957, Ser. No. 684,293

Claims priority, application Netherlands Sept. 27, 1956

7 Claims. (Cl. 178—88)

This invention relates to receivers for use in frequency-shift telegraphy, in which the demodulated signals taken from a frequency detector are supplied, through a direct-voltage restorer, to a pulse regenerator. Such a frequency-shift telegraphy receiver has the advantage of reducing the distortions which are produced in the telegraphy signals reproduced by the pulse regenerator by variations of the direct-voltage level of the demodulated signals, which variations may, for example, be due to variations in the transmitter frequency or in the receiver tuning.

It is an object of the present invention to provide a circuit arrangement of the kind described in which the said distortions are reduced to a minimum or even substantially avoided by simple means.

According to the invention, a receiver for frequency-shift telegraphy is characterized in that the direct-voltage restorer comprises two series-connected diodes and a bias supply which bridges this series combination, cuts off these diodes and is independent of the demodulated signals, the junction of the diodes constituting one output terminal and being connected, through a capacitor, to one of the input terminals, while the other input terminal and output terminal are connected to the bias supply.

According to a further feature of the invention, in order further to improve the signal transmission, the junction of the diodes of the direct voltage restorer is connected, through a resistor, to a correcting circuit which is fed with demodulated signals which are equal in phase, but increased in amplitude as compared with the signals at the output of the direct-voltage restorer.

Figure 1:
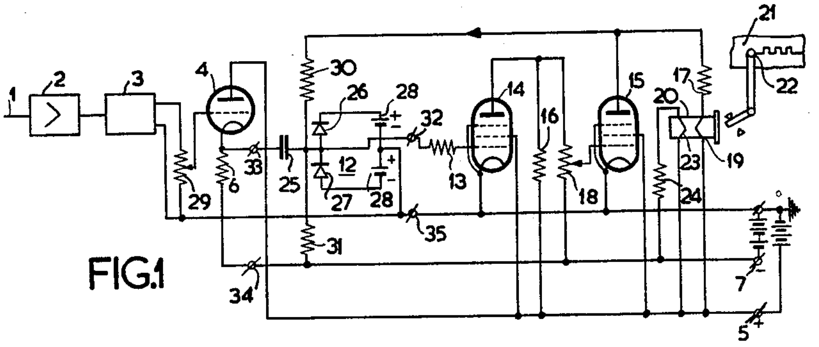
Figure 2:
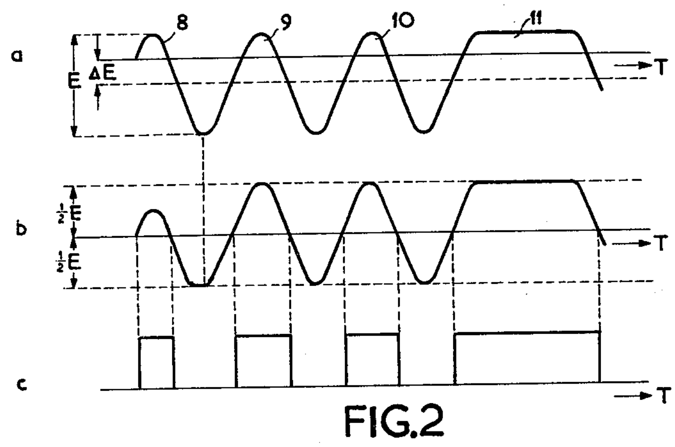
Figure 3:
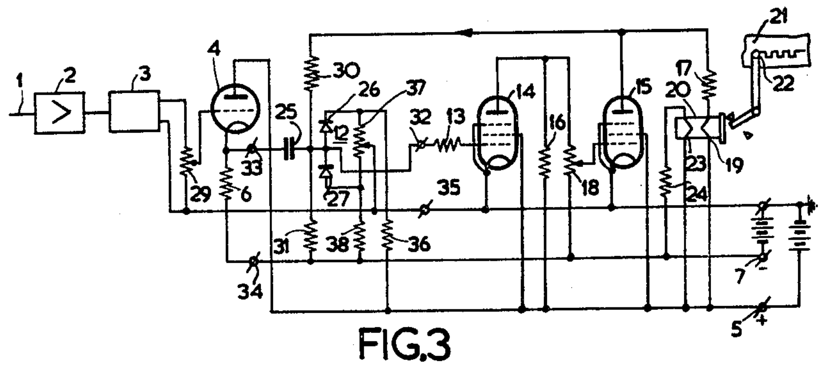

In order that the invention may readily be carried out, two embodiments thereof will now be described, by way of example with reference to the accompanying drawings, in which:

Fig. 1 shows a frequency-shift telegraphy receiver in accordance with the invention, Fig. 2 shows a number of voltage wave forms illustrating the operation of the telegraphy receiver shown in Fig. 1, and Fig. 3 shows a modified embodiment of the frequency-shift telegraphy receiver shown in Fig. 1.

The frequency-shift telegraphy receiver shown in Fig. 1 is to be used for carrier wave telegraphy, the band-width available in each channel being 120 c./s. and the frequency shift between the work and operative frequency being 2×35 c./s. Oscillations which vary in accordance with the signal modulation are received through a lead 1 and, after amplification in an amplifier 2 provided with automatic gain control, are supplied to a frequency detector 3 of the band-pass filter kind, which delivers a positive or a negative direct voltage according as the work frequency or the rest frequency is received. The demodulated signals thus obtained control a cathode follower comprising a triode 4 the anode of which is connected to a positive terminal 5 of a supply battery, the cathode being connected through a cathode resistor 6 to a negative terminal 7 of this battery.

In the diagram of Fig. 2*a*, the curve *a* shows the variation of signals which, at the beginning of a telegraphic message, are derived from the frequency discriminator in a given period of time and may comprise four marks 8, 9, 10 and 11. As is indicated in the figure, the direct-voltage level of the marks is shifted through a distance $-\Delta E$.

In order to avoid distortion in the reproduction of the indicated marks due to variations in the direct-voltage level of the signals derived from the cathode follower 4, the output voltage from the cathode follower 4 is supplied to a direct-voltage restorer 12 which is described hereinafter. To the output circuit of the signal restorer 12 there is connected through a series resistor 13, a regenerative pulse repeater comprising the cascade connection of two pentodes 14 and 15 which both amplify and limit the marks. The anodes of these pentodes 14, 15 are connected, through series resistors 16 and 17 respectively, to the positive terminal 5 of the supply battery while the cathodes are connected to earth, the output voltage from the pentode 14 being supplied to the control grid of the pentode 15 through a voltage divider 18 which is connected to the negative terminal 7.

In the anode circuit of the pentode 15 there is connected, in series with the resistor 17, an energizing winding 19 of a polarized relay 20, which is further provided with a second energizing winding 23 which is connected to the terminals 5 and 7 of the supply source in series with an adjusting resistor 24.

The polarized relay 20 each time responds to half the peak-to-peak value of the marks which, after correction of the direct-voltage level, are supplied to the regenerative pulse repeater 14, 15, and controls as is indicated diagrammatically in the figure, a writing device 22 arranged over a moving recording tape 21 for the reproduction of the received signals.

According to the invention, the direct-voltage source 12 comprises two series-connected diodes 26 and 27 and a bias supply, which bridges the series combination and cuts off the diodes, in the form of a battery 28, 28′, which supply is independent of the demodulated signals, the junction of the diodes 26, 27 constituting one output terminal 32 and being connected through a capacitor 25 to an input terminal 33, the other input terminal 34 and output terminal 35 being connected to a centre tap on the bias supply 28, 28′. By means of an adjustable voltage divider 29 provided in the output circuit of the frequency discriminator 3, the amplitude of the mark signals supplied to the input terminals 33, 34 of the direct-voltage restorer 12 is adjusted so that the peak-to-peak value of the marks is equal to the voltage E of the bias supply 28, 28′ bridging the rectifiers 26, 27. In order to minimize distortion, it is important to ensure that the peak-to-peak value of the demodulated mark signals supplied to the input of the direct-voltage restorer 12 is substantially constant and is about equal to the voltage E of the bias supply 28, 28′.

When the telegraphic signal shown in Fig. 2*a* is supplied to the direct-voltage restorer 13, during the positive part of the first mark 8 the diodes 26, 27 remain cut-off, since the positive peak value of the mark 8 is less than the cut-off voltage of the diodes 26 and 27 which is supplied by the batteries 28, 28′ and is ½E for each of the diodes 26 and 27. During the negative part of this mark 8, the diode 27 becomes conductive at the instant at which the voltage value of the mark 8 exceeds the voltage −½E of the battery 28′. As a result, the capacitor 25 is rapidly charged positively, through the low output impedance of the cathode-follower 4, to the peak-value concerned which is equal to the sum total of half the peak-to-peak value E of the demodulated signals and of the direct-voltage shift $\Delta E$ less the battery voltage ½E of the battery 28'. Consequently, during the negative half of the mark the capacitor 25 is charged to a voltage: $\frac{1}{2}E+\Delta E-\frac{1}{2}E=+\Delta E$, and this capacitor voltage is exactly equal in amplitude to the direct-voltage shift of the marks but is of opposite polarity.

Owing to the input signal shown in Fig. 2*a*, the output voltage of the direct-voltage restorer 12 has the variation shown in Fig. 2*b*, from which it will be seen that the signals derived from the output circuit of the direct-voltage restorer are completely corrected with respect to the direct-voltage shift $-\Delta E$. At each instant at which the peak-values of the marks shown in Fig. 2*b* attain the battery voltages $+\frac{1}{2}E$ and $-\frac{1}{2}E$ of the batteries 28 and 28' respectively, the diodes 26 and 27 respectively become conductive. Each time, the voltage set up at the capacitor 25 is compared with the instantaneous direct-voltage shift and, if required, the capacitor is charged to a voltage equal to this instantaneous direct-voltage shift.

Fig. 2*c* shows the voltage wave form of the signals reproduced by the polarized relay 20 on the recording tape 21. Distortions owing to variations of the direct-voltage level are reduced to a minimum by the direct-voltage restorer 12 described.

Under certain conditions, that is to say, after a prolonged signalling interval, a certain mark signal distortion can be produced in the next subsequent mark, and it was found that this distortion is due to the occurrence of small leakage currents, particularly of the grid current of the valve 14. If, during this prolonged signalling interval, the work signal is transmitted, which corresponds to a positive input signal in the direct-voltage restorer 12, the capacitor 25 is discharged by the grid current of the valve 14 through the series resistor 13. Consequently, the voltage of the capacitor 25 is gradually driven negative and the hitherto conductive diode 26 is cut-off so that after the signalling interval the capacitor voltage becomes different from a value which is required for correct signal transmission, and this variation of the capacitor voltages causes the distorted reproduction of the next subsequent mark.

In order to avoid these distortions due to the occurrence of leakage currents in the signalling intervals, the junction of the capacitor 25 and the diodes 26, 27 is connected, through a resistor 30, to a corrector circuit connected to the regenerative pulse repeater 14, 15, which circuit is fed with regenerated marks which are in phase with, but increased in amplitude with respect to, the marks at the output of the direct-voltage restorer 12. To this end, in the embodiment shown, the corrector circuit is connected to the anode circuit of the valve 15 of the regenerative pulse repeater 14, 15, the junction of the resistor 30 and the capacitor 25 being connected, through a resistor 31, to the negative terminal 7 of the voltage supply.

If, in the circuit arrangement shown, the work frequency occurs during a prolonged signalling interval, which corresponds to a positive input voltage of the direct-voltage restorer 12, the grid current of the valve 14 is supplied by the collector circuit so that the voltage of the capacitor 25 cannot be reduced. The voltage of the capacitor 25 is maintained exactly at its initial value, since the electrode of the capacitor 25 which is not connected to the cathode-follower 4 is maintained at a constant potential by the conductive diode 26. Similarly, during a signalling interval in which the rest frequency is received, which corresponds to a negative input voltage of the direct-voltage restorer 12, the capacitor voltages are prevented from flowing off.

The electrical values of the collector circuit are not critical provided that the collector circuit is capable of supplying a current exceeding the leakage currents in the direct-voltage restorer and the values of the resistors 30, 31 are sufficient to prevent them from influencing the normal operation of the direct-voltage restorer.

If the amplitude of the demodulated mark signals appearing at the output of the frequency detector 3 exceeds the amplitude of the mark signal at the output of the direct-voltage restorer 12, the collector circuits can also be fed with the demodulated marks derived from the frequency detector.

It should be remarked here, that the direct-voltage source in the direct-voltage restorer may also be a rectifier circuit arrangement which, for example, is fed through a transformer by the output voltage of the amplifier 2 for the frequency-modulated oscillations.

Figure 3 shows a modified embodiment of the frequency-shift telegraphy receiver shown in Fig. 1. Like elements are designated correspondingly.

The circuit arrangement shown differs from the receiver shown in Fig. 1 in that the bias voltage for the diodes 26, 27 is not taken from a battery but from a voltage divider, which is connected between the terminals 5, 7 of the voltage supply and comprises resistors 36, 37, 38, the resistor 37 shunting the diodes 26, 27 and having a centre tap which is connected to the input terminal 34 and the output terminal 35.

This circuit arrangement operates similarly to the frequency-shift telegraphy receiver shown in Fig. 1.

The values and type-numbers of the elements of a circuit arrangement which was exhaustively tested in practice were:

| | |
|---|---|
| Triode 4 | ECC 82 |
| Pentodes 14, 15 | E83 F |
| Diodes 26, 27 | OA 85 |
| Capacitor 25 | 20 μf. |
| Resistor 30 | 270 kΩ |
| Resistor 31 | 470 kΩ |
| Resistors 32, 35 | 22 kΩ |
| Resistors 33, 34 | 2 kΩ |
| Voltage at the supply terminal 5 | 120 v. |
| Voltage at the supply terminal 7 | −120 v. |
| Battery 28, 28' | 20 v. |
| Series resistor 13 | 1 MΩ |

At the work frequency, the voltages at the input of the direct-voltage restorer 12 and at the anode of the valve 15 are about 10 v. and 120 respectively, and at the rest frequency these voltages are about −10 v. and +20 v. respectively.

It may be remarked here, that it is not absolutely necessary for the input and output terminals of the direct-voltage restorer 12 to be connected to a centre tap on the bias-supply. When the said input and output terminals are not connected to a centre tap, the marks derived from the direct-voltage restorer contain a constant direct-voltage component, but this does not give rise to difficulty.

What is claimed is:

1. A receiver for telegraph signals, comprising a detector for detecting said signals, means applying said signals to said detector, and a direct-voltage restorer comprising an input terminal connected to the output of said detector, two diodes connected together with the anode of one diode being connected to the cathode of the other diode to form a series combination, means connecting said input terminal to the junction of said two diodes, a source of fixed bias voltage connected across said series combination and having a polarity to render said two diodes normally in a non-conductive condition, an output terminal connected to said junction of the two diodes, and a common terminal connected to a point on said source of bias voltage.

2. A receiver as claimed in claim 1, in which the value of said bias voltage is substantially equal to the peak-to-peak value of said telegraph signals.

3. A receiver as claimed in claim 1, in which said common terminal is connected to the center point of said source of bias voltage.

4. A receiver as claimed in claim 1, including a variable voltage divider interposed between said detector and said direct-voltage restorer.

5. A receiver as claimed in claim 1, in which said source of bias voltage comprises a tapped voltage divider connected across said series combination, said common terminal being connected to said tap.

6. A receiver as claimed in claim 1, including a corrector circuit connected to said junction of the two diodes and adapted to supply compensating pulses in phase with the telegraph signals.

7. A receiver for telegraph signals, comprising a detector for detecting said signals, means applying said signals to said detector, a direct-voltage restorer comprising an input terminal connected to the output of said detector, two diodes connected together with opposing polarities to form a series combination, means connecting said input terminal to the junction of said two diodes, a source of bias voltage connected across said series combination and having a polarity to render said two diodes normally in a non-conductive condition, an output terminal connected to said junction of the two diodes, and a common terminal connected to a point on said source of bias voltage, a regenerative pulse repeater having an input circuit connected to said output terminal, and a resistor connected between the output of said regenerative pulse repeater and said junction of the two diodes.

References Cited in the file of this patent

UNITED STATES PATENTS

| | | |
|---|---|---|
| 2,157,170 | Grundman | May 9, 1939 |
| 2,299,945 | Wendt | Oct. 27, 1942 |
| 2,630,486 | Rieke | Mar. 3, 1953 |
| 2,636,080 | Doba | Apr. 21, 1953 |
| 2,680,149 | Nixon | June 1, 1954 |
| 2,792,496 | Rhodes | May 14, 1957 |